United States Patent [19]

Anderton

[11] Patent Number: 4,824,198

[45] Date of Patent: Apr. 25, 1989

[54] HOUSING FOR A FIBER OPTIC SPLICE

[75] Inventor: John J. Anderton, Oil City, Pa.

[73] Assignee: GTE Products Corporation, Stamford, Conn.

[21] Appl. No.: 743,271

[22] Filed: Jun. 10, 1985

Related U.S. Application Data

[63] Continuation of Ser. No. 542,318, Oct. 17, 1983, abandoned, which is a continuation-in-part of Ser. No. 268,462, May 29, 1981, abandoned.

[51] Int. Cl.⁴ .............................. G02B 6/36; G02B 7/26
[52] U.S. Cl. ................................. 350/96.21; 350/96.20
[58] Field of Search ........................... 350/96.20, 96.21

[56] References Cited

U.S. PATENT DOCUMENTS

| | | | |
|---|---|---|---|
| 3,972,585 | 8/1976 | Dalgleish et al. | 350/96.21 |
| 4,257,674 | 3/1981 | Griffin et al. | 350/96.21 |
| 4,279,466 | 7/1981 | Makuch et al. | 350/96.21 |
| 4,449,784 | 5/1984 | Basov et al. | 350/96.21 |

Primary Examiner—William L. Sikes
Assistant Examiner—Robert E. Wise
Attorney, Agent, or Firm—William H. McNeill

[57] ABSTRACT

A fiber optic splice assembly comprises a hermaphroditic splice housing comprised of mating housing halves. Each of the halves provides a first cavity for a ferrule crimp and both of the halves, when mated, define a second cavity for an elastomeric splice. The splice includes a metallic sleeve and an elastomeric insert, the insert preferably offers an opening having a triangular cross-section so that contact is made with a glass fiber at three points on the circumference of the fiber. The ferrule crimps, one is provided for each of the two fibers to be spliced, also include an elastomeric insert and a ferrule crimped about the insert so as to provide strain relief for the glass fiber when the fiber is enclosed in the housing. The insert assumes a configuration dictated by the particular optical fiber cable configuration encountered. The housing halves are characterized by substantially identical contours and are therefore interchangeable. In particular, the housing halves contain a locking portion comprised of an integumentary layer with circumferential slots and an interior layer with mating locking flanges.

1 Claim, 2 Drawing Sheets

HOUSING FOR A FIBER OPTIC SPLICE

This application is a continuation of application Ser. No. 542,318, now abandoned, filed Oct. 17, 1983 which is a continuation-in-part of Ser. No. 268,462, filed May 29, 1982 now abandoned.

TECHNICAL FIELD

This invention relates to the implementation of fiber optic communication systems and more particularly to an apparatus for maintaining a splice between the ends of at least two optical fibers.

BACKGROUND OF THE INVENTION

Transmission of information via fiber optic cables has been shown to offer several advantages, among them an extremely wide bandwidth communication channel offering substantial immunity to electrical interference.

As fiber optic technology has grown in sophistication, cable manufacturers have developed variations in cable configurations. The variations are intended to enhance the reliability and performance of the systems but have also introduced complications when it is found necessary to form a splice between two optical fibers. The quality of the splice, both in terms of the separation between the cables and their axial alignment, is especially important in that it directly affects the efficiency of optical transmission between the cables.

Numerous techniques have been developed in an attempt to effectuate a splice as desired. For example, U.S. Pat. No. 4,078,910 to Dalgoutte describes a method of joining cables by inserting the two ends of the cables into opposite ends of a glass sleeve having a bore that provides a clearance fit around the perimeters of the cables. The sleeve is heated at the abutment of the cable ends and, because it has a lower melting point than the cables, collapses around the cable. Subsequently a length of heat-shrinkable tubing may be placed over the sleeve in order to enhance the mechanical strength of the splice. U.S. Pat. No. 3,883,353 to Cohen et al. is directed to a photolitographic technique for shaping the opposing ends of the fiber optic cable. One end is formed to provide a protruding portion; conversely, the other end is formed to provide a complementary indented portion. The result is a male-to-female connection at the fiber ends.

An alternate approach is described in U.S. Pat. No. 4,056,305 to McCartney et al. That patent is directed to a fiber optic connector comprising a deformable elastomeric material having an axially aligned bore. Dual sets of at least three rods are mounted within the bore. Because the rods have substantially identical diameters they form a tricuspid aperture. The dimensions of the aperture are such that insertion of the cables causes the elastomeric material to be compressed, thereby exerting a radial force on the rods. It is asserted that in this manner the cables become precisely laterally aligned.

U.S. Pat. No. 3,734,594 to Trambarulo describes an optical fiber splice having a deformable annular core disposed between a pair of metallic pressure plates. The two fibers to be spliced are inserted into opposite ends of the core and a longitudinal force is applied to the plates. This causes the core to deform radially, thereby simultaneously aligning and mechanically securing the fibers.

A similar technique is described in U.S. Pat. No. 4,178,067 to Johnson et al. according to which a cylindrical body of heat recoverable matter such as polyethylene, polystyrene or polyvinyl chloride, is heated, axially stretched, then cooled in order to reduce the diameter of the material. The resultant diametrical reduction operates to confine two previously inserted optical waveguides. The material is confined within a cylinderical sleeve comprised of a dimensionally stable material such as metal, glass or any stable polymeric material.

The above is intended as an exemplification of the various attempts made and approaches taken in order to effectuate a quality splice between at least two fiber optic cables. Although more or less effective, these techniques have specific drawbacks; in particular, specialized and cumbersome tools are often required to perform a simple splicing task.

U.S. patent application Ser. No. 268,462, "Fiber Optic Ferrule Crimp", filed May 29, 1981 and now abandoned discloses a ferrule crimp for use in conjunction with the splices such as those referred to above. The ferrule comprises an elastomeric insert having a substantially axially aligned bore designed to accommodate variously configured fiber optic cables. A deformable sleeve surrounds the insert so that when a predetermined length of cable has been extended through the insert the sleeve may be crimped, thereby fixing the ferrule positon with respect to the end of the cable. Subsequently, a housing, preferably one such as embodied by the subject invention, may be closed around a pair of such ferrules so arranged in order to form a compression loop in the cables thereby maintaining an end-to-end abutment of the cables.

DISCLOSURE OF THE INVENTION

The above and other objects, advantages and capabilities are achieved in one aspect of this invention by a fiber optic splice assembly including a hermaphroditic housing comprised of substantially identical mating halves. Each half provides at least a first cavity for a ferrule crimp residing therein. Both halves, when mated define a third cavity for an elastomeric splice which resides therein.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
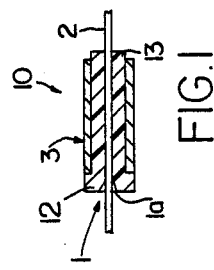
FIG. 1 is a cross-sectional review of a fiber optic ferrule crimp.

Referring now to FIG. 1, a ferrule crimp 10 depicted therein comprises a substantially cylindrical insert 1 having a substantially cylindrical, axially positioned aperture or bore 1a. The radius of the aperture is selected to accommodate an optical fiber 2. (The optical fiber itself is no part of this invention.) The insert may consist of a suitable elastomeric material such as silicone or polyurethane. The insert 1 has a body 13, which in a particular embodiment has a nominal diameter of 0.1 inches. The insert 1 includes a flange portion 12 having a nominal diameter of 0.15 inches. The length of the insert is nominally 0.4 inches. It should be noted that the above dimensions are exemplary only and are not to be construed as limiting the scope of this invention.

The ferrule crimp 10 also includes a cylindrical sleeve 3, comprised of a deformable, e.g. metallic, material surrounding the insert 1. The sleeve 3 is dimensioned and positioned so that the sleeve has one end that is in proximity with, although not necessarily contiguous to, the flange 12 of the insert 1 and extends approximately to the other end of the insert.

Figure 2A:
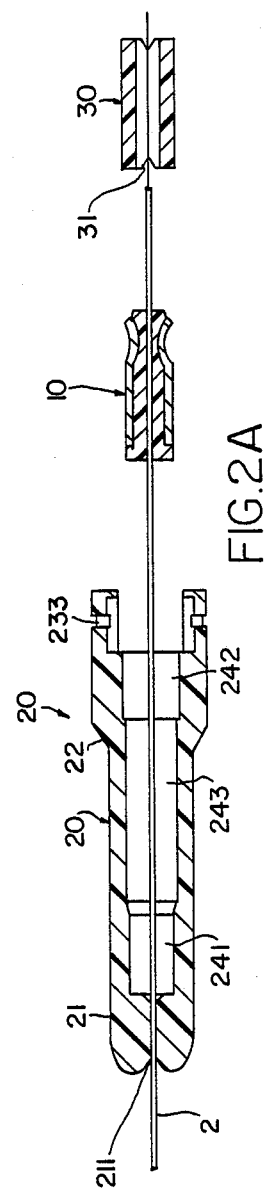
FIG. 2a is a sectional view of one part of a housing.

Ferrule crimp 10 is an integral element of the complete cable splicing assembly illustrated in FIG. 2A. The assembly includes, in addition to a pair of ferrule crimps 10, a two-piece engagable housing 20 and a fiber optic splice 30.

The housing 20 comprises substantially identical, and therefore, interchangeable, mating sections. Each of the sections exhibits substantially tubular contour and is characterized by a primary portion 21 having an orifice 211 at one end for the insertion of an optical fiber; a tubular locking portion 23 having a diameter greater than the diameter of the primary portion 22, and a tapered portion disposed between and joining the primary portion 21 and the locking portion 23. The housing 20 provides a trisectional, substantially cylindrical cavity 24 comprising a first section 241 having a diameter appropriate for the insertion of a ferrule crimp 10, a second section 242 having a diameter greater than the diameter of the first section and appropriate for the insertion of an elastomeric splice 30, and an intermediate section 243 disposed between the first section 241 and the second section 242 and having a diameter greater than the diameter of the first section but less than the diameter of the second section.

The locking portion 23 is comprised of an interior layer 231 and integumentary layer 232 which extends a finite distance beyond the interior layer. The integumentary layer 232 has a pair of diametrically opposed slots 233 while the interior layer 231 comprises a pair of complementary, diametrically opposed, locking flanges 234.

Although the subject invention is not limited to the specific splice shown in the drawing, the operation and construction of that splice are fully explained in U.S. Pat. No. 4,257,674 to Wendell L. Griffin, et al., assigned to the assignee of this invention, and hereby incorporated by reference. In essence, the splice is constructed from a preferrably transparent elastomeric material. The splice 30 has an opening 31 with a diameter smaller than that of the fiber 2. As the fibers are inserted into the opening, the walls of the splice tend to expand. Elastic restoring forces exerted on the fibers tend to maintain them in proper alignment and hold them within the opening. The opening preferably has a triangular cross-section so that contact is made with a fiber of circular cross-section at three locations on the circumference of the fiber. Fibers used in communications systems typically have a silica cladding characterized by a refractive index lower than that of the fiber core. The outer cladding may be removed and the ends of the silica fiber dipped into an index matching fluid prior to insertion, thereby minimizing optical losses due to reflections from the ends of the fibers and facilitating insertion of the fiber.

In practice the entire splicing operation proceeds as follows:

(1) The installer exposes a predetermined length of buffered or unbuffered fiber from the cable.

(2) The housing 202 is then slid on each end of the fibers 2 to be spliced.

(3) The installer selects a ferrule crimp 10 having a central aperture required by the fiber to be spliced and slides the ferrule on the ends of the fibers to be spliced.

(4) Ferrules are then crimped onto the fiber using standard crimp tooling such as IDEAL INC. #83-001.

(5) Crimped fibers are then stripped an exact distance from the ferrule by the use of standard wire strippers which have a gage plate attached to hold the ferrule exact distance from the stripping knife.

(6) The fibers are then cut to the proper length using a cleaving tool such as described in U.S. Pat. No. 4,159,793 and modified with a gage plate added to hold the ferrule an exact distance from the cutting edge.

(7) The fibers are then connected using the elastomeric fiber splice 30 as described above.

(8) The installer now closes the housing 20 around the ferrule crimps 10 and in so doing creates a compression loop 50 in each fiber which prevents the fibers from pulling out of the splice during handling. This allows the buffering compounds to cure without a lengthy wait or acceleration of the cure by means of heat or ultra-violet radiation.

Figure 2B:
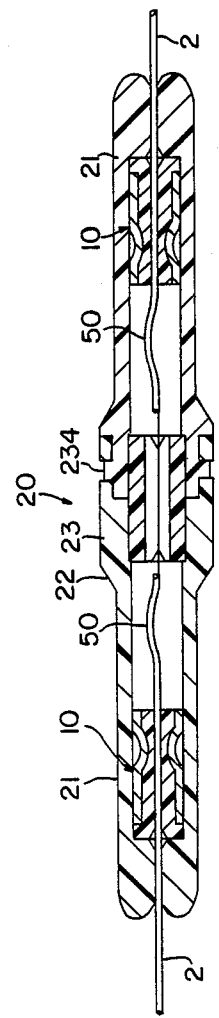
FIG. 2b is a sectional view of a complete splice assembly including the cables, elastomeric splice, ferrule crimps, and the subject hermaphroditic splice housing.

A cross-sectional view of a complete fiber optic splice assembly, including the spliced cables, and ferrule crimps is illustrated in FIG. 2B.

Figure 3:
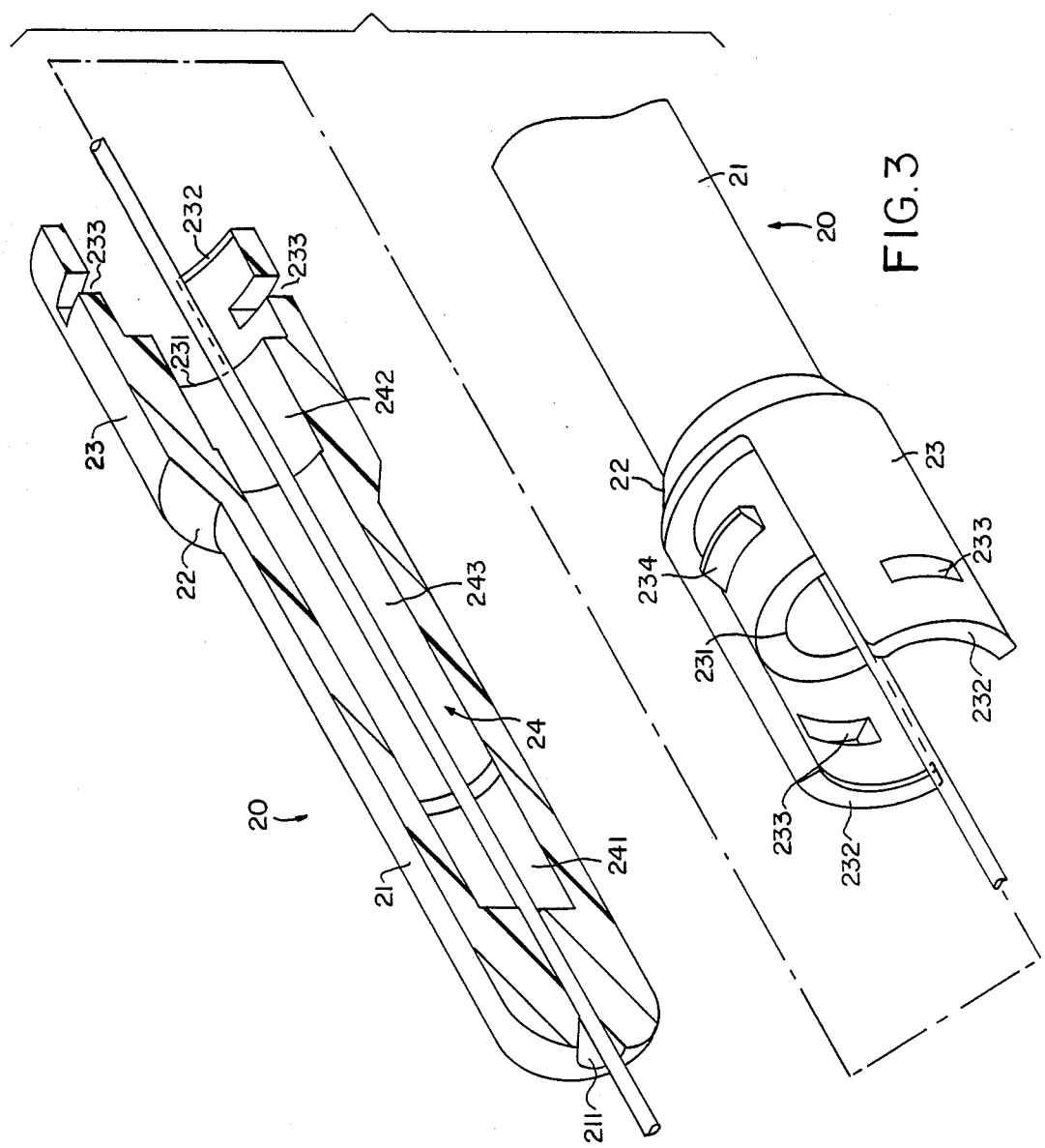
FIG. 3 is an isometric, exploded view of the splice housing, including a sectional view of one of the housing halves.

FIG. 3 provides a detailed representation of a preferred housing 20 for use in conjunction with the splicing operation described above. The housing, as depicted therein, is seen to have a generally tubular contour characterized by a primary portion 21 having an orifice 211 for the insertion of an optical fiber 2. A tapered portion 22 is disposed between and joins the primary portion 21 and a locking portion 23. The locking portion 23 has a diameter greater than the diameter of the primary portion 21.

The housing is formed so as to provide a trisectional interior cavity 24 comprising a first section 241 having a diameter appropriate for the insertion of the ferrule crimp 10 and a second section 242 having a diameter greater than the diameter of the first section and appropriate for the insertion of the elastomeric splice 30. An intermediate section 243 is disposed between the first and second sections and has a diameter greater than the diameter of the first section but less than the diameter of the second section.

The locking portion 23 of the housing 20 is comprised of an interior layer 231 and an integumentary layer 232 which extends beyond the interior layer. The integumentary layer 232 exhibits a pair of slots 233 diametrically disposed on the circumference thereof. The interior layer 231, on the other hand, comprises a pair of tapered locking flanges 234 (only one is viewable in FIG. 3), also diametrically opposed about and extending upward from its exterior surface. As can be easily deduced from FIG. 3, the slots are circumferentially offset from the locking flanges approximately 90-degrees.

Mating of the housing sections is effected by aligning the, slots 233 of one section with the complementary locking flanges 234 of the opposing section and pressing the two sections together. In this operation the integumentary layers 232 of mating sections are oriented in 90-degree rotational oppostion so as to properly align mating slots and locking flanges. When the two sections of the housing are thusly mated, the respective locking portions come together so as to define a cavity for the retention of the elastomeric splice 30.

The "hermaphroditic" housing construction requires only one configuration, thereby obviating the need to mate male and female sections so as to form a locking pair.

Accordingly, while there has been shown and described what is at present considered a preferred emobodiment of a fiber optic splice housing, specifically a splice housing for use with an elastomeric splice and ferrule crimps, it will be obvious to those skilled in the art that variations and modifications may be made therein without departing from the scope of the invention as defined by the appended claims.

INDUSTRIAL APPLIABILITY

The subject invention is useful in communication and information delivery equipments and systems that utilize fibers as a trasmission medium.

What is claimed is:

1. A fiber optic splice assembly comprising:
   a splice housing composed of mating hermaphroditic housing halves, each half providing at least a first cavity and both halves, when mated, defining a third cacity, and
   a ferrule crimp residing in each of said first cavities and an elastomeric splice residing in said third cavity defined by said mated housing halves.

* * * * *